(12) United States Patent
Tyvoll et al.

(10) Patent No.: US 9,546,292 B2
(45) Date of Patent: Jan. 17, 2017

(54) INK ADDITIVE COMBINATIONS FOR IMPROVING PRINTHEAD LIFETIME

(71) Applicant: Memjet Technology Limited, Dublin (IE)

(72) Inventors: David Tyvoll, San Diego, CA (US); Simon Fielder, North Ryde (AU); Michele Gimona, North Ryde (AU); Christopher Barton, North Ryde (AU); Jognandan Prashar, North Ryde (AU); Michele Shepard, San Diego, CA (US); Iain Blake, North Ryde (AU); Richard Myors, North Ryde (AU); Luke Grassy, North Ryde (AU)

(73) Assignee: Memjet Technology Limited (IE)

( * ) Notice: Subject to any disclaimer, the term of this patent is extended or adjusted under 35 U.S.C. 154(b) by 0 days.

(21) Appl. No.: 14/877,478

(22) Filed: Oct. 7, 2015

(65) Prior Publication Data
US 2016/0137861 A1 May 19, 2016

Related U.S. Application Data

(60) Provisional application No. 62/081,713, filed on Nov. 19, 2014, provisional application No. 62/138,591, filed on Mar. 26, 2015.

(51) Int. Cl.
*C09D 11/38* (2014.01)
*C08K 5/06* (2006.01)
(Continued)

(52) U.S. Cl.
CPC .......... *C09D 11/38* (2013.01); *B41J 2/01* (2013.01); *C08K 5/06* (2013.01); *B01D 69/02* (2013.01); *B41J 2/2107* (2013.01); *B41J 2/5052* (2013.01); *B41M 5/5218* (2013.01); *C09C 1/0036* (2013.01); *C09C 1/0063* (2013.01); *C09D 5/082* (2013.01)

(58) Field of Classification Search
CPC ........... B41J 2/2107; B41J 2/01; B41J 2/5052; B41M 5/5218; C09C 1/0036; C09C 1/0063; C09D 5/082; B01D 69/02
See application file for complete search history.

(56) References Cited

U.S. PATENT DOCUMENTS

| 5,709,737 A | 1/1998 | Malhotra |
| 6,086,661 A | 7/2000 | Malhotra |
(Continued)

FOREIGN PATENT DOCUMENTS

| EP | 0972651 A1 | 1/2000 |
| WO | 2015/003910 A1 | 1/2015 |
| WO | 2015/144419 A1 | 10/2015 |

OTHER PUBLICATIONS

CAS sheet: 1,4-Bis(2hdryoxyethoxy)-2-butyne from Santa Cruz Biotech.*
(Continued)

*Primary Examiner* — Lisa M Solomon
(74) *Attorney, Agent, or Firm* — Cooley LLP

(57) ABSTRACT

An inkjet ink for improving printhead lifetimes includes: an aqueous-based ink vehicle; a colorant; an anti-kogation additive; and an anti-corrosion additive having at least one acetylenic group, the acetylenic group being absent any tertiary or quaternary α-carbon atoms.

24 Claims, 3 Drawing Sheets

(51) Int. Cl.
*B41J 2/01* (2006.01)
*C09C 1/00* (2006.01)
*B41J 2/505* (2006.01)
*B01D 69/02* (2006.01)
*B41M 5/52* (2006.01)
*C09D 5/08* (2006.01)
*B41J 2/21* (2006.01)

(56) References Cited

U.S. PATENT DOCUMENTS

| | | |
|---|---|---|
| 6,495,243 B1 | 12/2002 | Malhotra |
| 2011/0193911 A1* | 8/2011 | Bisson ................... B41J 2/0458 347/17 |
| 2013/0176368 A1 | 7/2013 | Wheeler |

OTHER PUBLICATIONS

Wikipedia Article: 1,4-Butynediol [Section: Synthesis and Applications].*
Wikipedia Article: Polyethylene glycol [Section: Available forms and nomenclature and Commercial Uses].*
Wikipedia Article: Surfactant [Section: Anionic—Sulfate, sulfonate, and phosphate esters].*
International Search Report and Written Opinion, PCT Application No. EP2015/074423, mailed Dec. 9, 2015, 13 pages.

* cited by examiner

INK ADDITIVE COMBINATIONS FOR IMPROVING PRINTHEAD LIFETIME

FIELD OF THE INVENTION

This invention relates to an inkjet ink. It has been developed primarily for improving the lifetime of printheads, and particularly the Applicant's Memjet® printheads.

BACKGROUND OF THE INVENTION

The present Applicant has developed a plethora of high-speed inkjet printers employing stationary Memjet® printheads which extend across a media width. By contrast, virtually all other types of inkjet printer utilize a scanning printhead which traverses across the media width.

High-speed pagewidth printing necessarily places additional demands on the design of the printhead compared to traditional types of inkjet printhead. The nozzle devices must have a self-cooling design, high ink refill rates and high thermal efficiency. To this end, the Applicant has developed a range of thermal bubble-forming printheads, including those with suspended resistive heater elements (as described in, for example, U.S. Pat. No. 6,755,509; U.S. Pat. No. 7,246,886; U.S. Pat. No. 7,401,910; and U.S. Pat. No. 7,658,977, the contents of which are incorporated herein by reference) and those with embedded ("bonded") resistive heater elements (as described in, for example, U.S. Pat. No. 7,377,623; U.S. Pat. No. 7,431,431; U.S. Pat. No. 2006/250453; and U.S. Pat. No. 7,491,911, the contents of which are incorporated herein by reference).

Nozzle devices having suspended heater elements offer the advantages of efficient heat transfer from the heater element to the ink and self-cooling characteristics. However, they suffer from the disadvantage of relatively short printhead lifetimes, because suspended heater elements are typically less robust than their bonded counterparts.

One approach to improving printhead lifetime is to coat the heater elements with a layer of protective coating. For example, U.S. Pat. No. 6,719,406 (assigned to the present Applicant) describes suspended heater elements having a conformal protective coating, which improves the robustness of the heater element and improves printhead lifetime. However, protective coatings are undesirable for a number of reasons—they reduce the efficiency of heat transfer from the resistive heater elements to the surrounding ink; they consequently affect the self-cooling characteristics; and they introduce additional MEMS fabrication challenges.

Therefore, it is generally preferable to employ uncoated ("naked") heater elements in Memjet® printheads, or at least heater elements having very thin (e.g. less than 50 nm) coatings. To some extent, the choice of heater material can mitigate the effects of using uncoated heater elements. For example, U.S. Pat. No. 7,431,431 describes the use of a self-passivating titanium aluminium nitride heater element, which has improved lifetime compared to more conventional materials, such as titanium nitride. Nevertheless, there is still a need to improve the lifetimes of Memjet® printheads, and particularly those employing uncoated heater elements.

It has been found that certain inks are particularly aggressive towards heater elements. For example, many dye-based inks have been found to corrode heater elements resulting in shortened printhead lifetimes. In a multi-color printhead (e.g. CMYK), the printhead lifetime is, to a large extent, limited by the lifetime of the color channel having the shortest lifetime. If, for example, a black dye-based ink is found to be particularly corrosive towards heater elements, then the lifetime of the printhead will be determined by the lifetime of the black channel, even if all other color channels still perform well when the black color channel fails.

In the present context, "failure" of a nozzle device means any change in drop ejection characteristics which results in unacceptable print quality. For example, failure may be invoked by a reduction in drop velocity, poor drop directionality or non-ejection of ink. Moreover, the criteria for failure may be different for different colors. For example, a reduction in print quality in a yellow channel may be more tolerable than a corresponding reduction in print quality in a black channel, because black ink is more visible to the human eye (i.e. black ink has a higher luminance on white paper). This, in combination with the aggressive nature of many black dyes, means that the black channel in a Memjet® printhead is typically the limiting color channel in terms of printhead lifetime.

It would be desirable to improve the lifetime of printheads employing resistive heater elements.

U.S. application Ser. No. 14/310,298 filed on June 2014, the contents of which are incorporated herein by reference, describes the use of ethoxylated butyne-1,2-diols for improving printhead lifetimes.

U.S. Pat. No. 5,180,425 describes pigment-based ink compositions comprising an ethoxylated glycerol co-solvent for improving printhead lifetimes.

U.S. Provisional Application No. 61/971,985 filed on Mar. 28, 2014, the contents of which are incorporated herein by reference, describes certain dye and co-solvent combinations for improving printhead lifetimes.

SUMMARY OF THE INVENTION

In a first aspect, the present invention provides an inkjet ink comprising:
an aqueous-based ink vehicle;
a colorant;
an anti-kogation additive comprising a first organic compound having at least three moieties selected from the group consisting of: —($CH_2CH_2O$)—; —($CH_2CH(Me)O$)—; and —$CH_2OH$; and
an anti-corrosion additive comprising a second organic compound having at least one acetylenic moiety, the acetylenic moiety being absent any tertiary or quaternary α-carbon atoms.

Inkjet inks according to the present invention provide exceptional printhead lifetimes when compared to, for example, comparable inks comprising either the anti-kogation additive or the anti-corrosion additive alone. It was therefore concluded by the present inventors that the two compounds are behaving synergistically in situ to protect thermal actuators and extend their lifetime. Furthermore, the synergistic combination expands the range of anti-corrosion and anti-kogative agents available to achieve a target printhead lifetime. Expanding the range of useful additive combinations provides a wider formulation window for meeting other ink requirements e.g. surface tension, viscosity, dehydration performance etc.

Preferably, the first organic compound has at least 6, or preferably at least 9 ethoxylate or propoxylate groups. The maximum degree of ethoxylation or propoxylation is not particularly limited and the first organic compound may have up to 50, or up to 100 ethoxylate or propoxylate groups.

Preferably, the anti-kogation additive is selected from the group consisting of glycerol ethoxylates, glycerol propoxylates, erythritol ethoxylates, erythritol propoxylates, arabitol ethoxylates, arabitol propoxylates, mannitol ethoxylates, mannitol propoxylates, trimethylolpropane ethoxylates, trimethylolpropane propoxylates, pentaerythritol ethoxylates, pentaerythritol propoxylates, polyethylene glycols (e.g. PEG200, PEG300, PEG400, PEG600, PEG1000, PEG2000 etc), polypropylene glycols, tris(hydroxymethyl) phosphine, tris(hydroxymethyl)phosphine ethoxylates, tris (hydroxymethyl)phosphine propoxylates, tris(hydroxymethyl)phosphine oxide, tris(hydroxymethyl)phosphine oxide ethoxylates, tris(hydroxymethyl)phosphine oxide propoxylates, triethanolamine, triethanolamine ethoxylates, triethanolamine propoxylates, ethylene diamine ethoxylates and ethylene diamine propoxylates.

Preferably, the anti-kogation additive is selected from the group consisting of glycerol ethoxylates, glycerol propoxylates, polyethylene glycols and tris(hydroxymethyl)phosphine.

Preferably, the anti-kogation additive is an alkoxylated glycerol compound of formula (A):

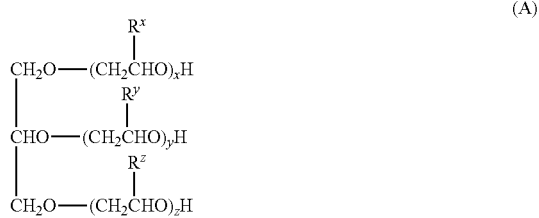

(A)

wherein:

$R^x$, $R^y$ and $R^z$ are independently selected from the group consisting of hydrogen and methyl; and x, y and z are each integers in the range of 1 to 50.

Preferably, $R^x$, $R^y$ and $R^z$ are each hydrogen and x+y+z=3 to 30. A preferred example of a commercially-available alkoxylated glyercol compound of formula (B) is Liponic® EG-1 (sometimes known in the art as "LEG-1"), available from Lipo Chemicals.

The anti-corrosion additive generally has little or no surfactancy by virtue of the acetylenic group being absent any tertiary or quaternary α-carbon atoms.

Preferably, the anti-corrosion additive is an acetylenic compound of formula (B):

(B)

wherein:

$R^1$ is selected from the group consisting of: H, $C_{1-3}$ alkyl, —$(CH_2)_pCH(R^4)(R^5)$ and —$(C\equiv C)$—$(CH_2)_pCH(R^4)(R^5)$;

$R^2$ is selected from the group consisting of: H and $C_{1-3}$ alkyl;

$R^3$ is selected from the group consisting of: —$CH_2$— and —$CH(CH_3)$—;

$R^4$ is selected from the group consisting of: H and $C_{1-3}$ alkyl;

$R^5$ is selected from the group consisting of: H, $C_{1-3}$ alkyl, —OH and —$(OCH_2R^3)_q$—OH;

m is 0, 1, 2 or 3;

p is 0, 1, 2 or 3; and n is 0 or an integer in the range of 1 to 50; and q is an integer in the range of 1 to 50.

Preferably, $R^1$ is selected from the group consisting of: H, $C_{1-3}$ alkyl; and —$(CH_2)_pCH(R^4)(R^5)$;

Preferably, $R^5$ is selected from the group consisting of: —OH and —$(OCH_2R^3)_q$—OH;

Preferably, n is an integer in the range of 1 to 50.

Preferably, the anti-corrosion additive is of formula (C):

(C)

wherein:

$R^6$ is selected from the group consisting of: —$CH_2OH$ and —$CH_2(OCH_2CH_2)$—OH.

A preferred example of a commercially-available acetylenic compound of formula (B) and (C) is Butoxyne™ 497, having the systematic name 1,4-bis(2-hydroxyethoxy)-2-butyne.

Preferably, the aqueous-based ink vehicle comprises water and one or more co-solvents.

Preferably, the one or more co-solvents are selected from the groups consisting of: sulfolane, ethylene glycol, diethylene glycol, triethylene glycol, tetraethylene glycol, glycerol, 1,3-propanediol, 2-pyrrolidone and N-methyl-2-pyrrolidone. Some preferred co-solvent combinations are described in U.S. Provisional Application No. 61/971,985 filed on Mar. 28, 2014. For example, dye-based inks comprising sulfolane and higher order glycols (e.g. triethylene glycol, tetraethylene glycol etc.) may be employed in some embodiments.

Preferably, the aqueous-based ink vehicle comprises one or more surfactants. The choice of surfactant(s) is not particularly limited and may comprise any nonionic, anionic or cationic surfactant. Examples of suitable surfactants are described in more detail herein.

Preferably, the anti-kogation additive is present in an amount ranging from 0.5 to 10 wt. %, or preferably from 0.5 to 5 wt. %, or preferably from 1 to 3 wt. %.

Preferably, the anti-corrosion additive is present in an amount ranging from 0.5 to 5 wt. %, or preferably from 1 to 5 wt. %, or preferably from 0.5 to 3 wt. %.

Preferably, a ratio of the anti-corrosion additive to anti-kogation additive is in the range of 1:5 to 5:1.

In some embodiments, the anti-kogation additive as a high viscosity and it is desirable to employ a minimal amount of the anti-kogation additive in order not to raise the viscosity of the ink beyond an acceptable threshold. Preferably, the amount of the anti-kogation additive is 2 wt. % or less in order to minimize increases in ink viscosity.

Preferably, an amount of the anti-corrosion additive is greater than an amount of the anti-kogation additive when the anti-kogation additive is an alkoxylated glycerol compound of formula (A). Preferably, the amount of the anti-corrosion additive is at least 1.5 times greater or at least 2 times greater than the amount of anti-kogation additive when the anti-kogation additive is an alkoxylated glycerol compound of formula (A). A greater relative amount of anti-corrosion additive has been shown to provide optimal printhead lifetimes.

Preferably, a combined amount of the anti-kogation additive and the anti-corrosion additive is in the range of 1 to 10 wt. % or 1 to 5 wt. %. It is an advantage of the present invention that the total amount of additives required to produce a significant improvement in printhead lifetimes is relatively low. Therefore, the use of these additives does not impact severely on the overall balance of ink characteristics required for good drop ejection performance, rapid nozzle chamber refill, efficient printhead priming etc.

The type of colorant is not particularly limited and may be a dye or pigment. The efficacy of the present invention has been demonstrated in a range of different colored inks Examples of suitable colorants are described in more detail herein.

As described in U.S. application Ser. No. 14/310,298, the acetylenic anti-corrosion additive has little or no surfactancy and, therefore, has minimal effect on the surface tension of the ink. Therefore, the addition of this acetylenic compound has minimal effect on the overall balance of ink properties, which is particularly advantageous when formulating inks within certain surface tension and viscosity parameters.

In a second aspect, there is provided a method of improving a lifetime of an inkjet printhead comprising the steps of:

supplying an ink as described above to nozzle chambers of the printhead, each nozzle chamber having an associated actuator in contact with the ink; and actuating one or more of the actuators to eject ink from the printhead.

Preferably, each actuator comprises a resistive heater element.

Preferably, the heater element is uncoated.

Preferably the heater element is comprised of a material selected from the group consisting of: a titanium alloy (e.g. TiAl alloy); titanium nitride; and a nitride of a titanium alloy (e.g. titanium aluminium nitride).

Preferably, each actuator of the printhead has a lifetime of at least 150 million ejections, preferably at least 200 million ejections, preferably at least 300 million ejections or preferably at least 400 million ejections.

In a third aspect, there is provided an inkjet printer comprising:

an inkjet printhead having a plurality of nozzle chambers, each nozzle chamber having an associated actuator for contacting ink; and an ink reservoir in fluid communication with the nozzle chambers, the ink reservoir containing an ink as described above.

Preferred embodiments of the second and third aspects will be readily apparent from the foregoing. Preferred embodiments, where described, are not intended to be limited to any particular aspect of the present invention.

BRIEF DESCRIPTION OF THE DRAWINGS

Various embodiments of the present invention will now be described by way of example only with reference to the accompanying drawings, in which.

DETAILED DESCRIPTION OF THE INVENTION

Figure 1:
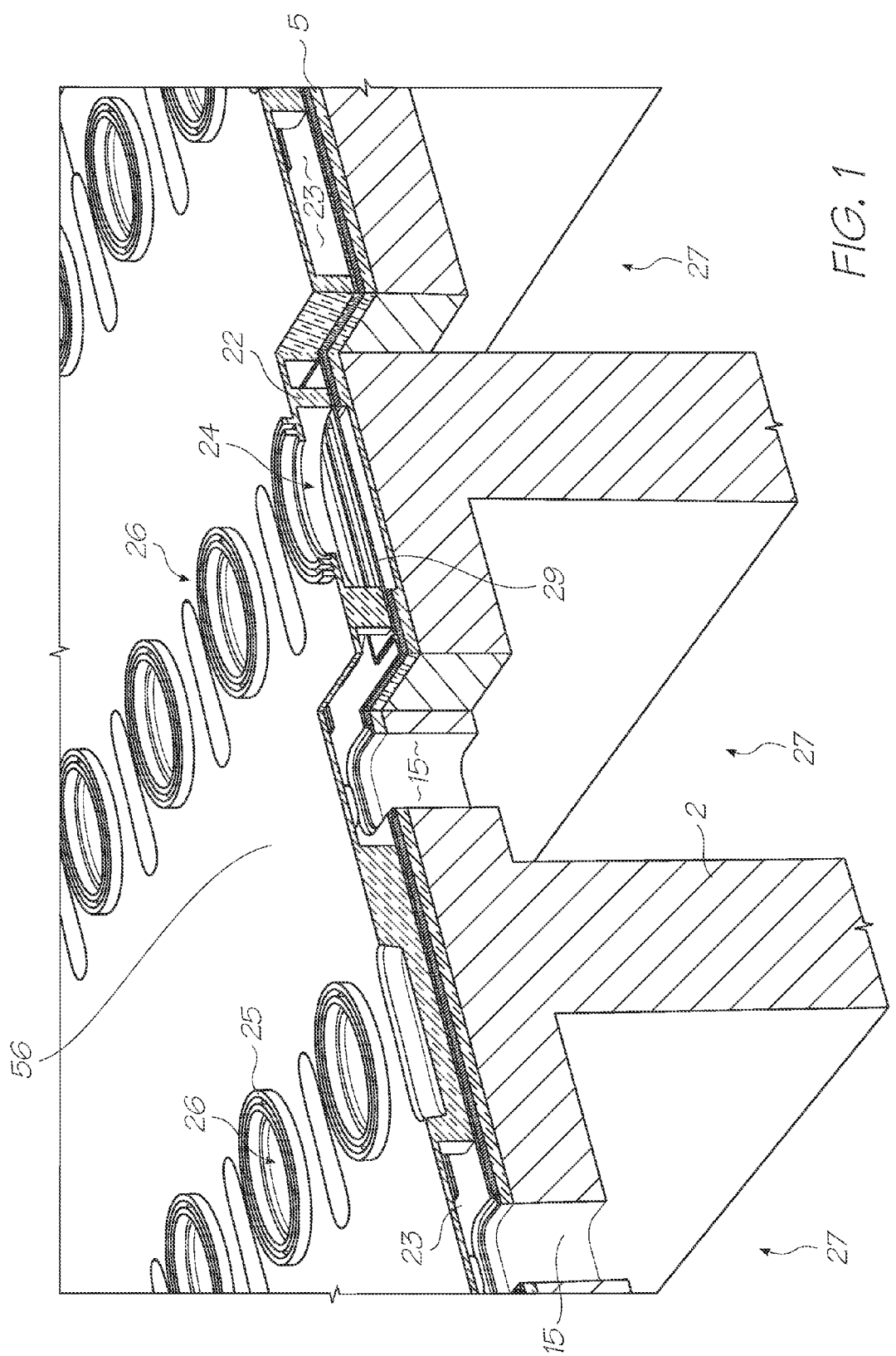
FIG. 1 is a perspective view of part of a thermal inkjet printhead.

The present inventors have sought a solution to the problem of improving printhead lifetime by investigating various additives in ink formulations. As foreshadowed above, an ink formulation is an attractive solution to the problem of improving printhead lifetime, because it potentially obviates any modifications to the design of the printhead.

Surprisingly, it was found that by combining anti-kogation and anti-corrosion additives, as defined above, in aqueous-based inkjet ink compositions, an exceptional improvement in printhead lifetime was achieved. Significantly, this improvement was over and above any improvement achieved by either additive alone when added to the ink composition. It was therefore concluded that there is a synergistic effect between the anti-kogation and anti-corrosion compounds. This synergy had hitherto not been suggested anywhere in the prior art. Experimental observations supporting this synergistic effect are described in more detail below.

Colorant

The inks utilized in the present invention may be dye-based or pigment-based.

Inkjet dyes will be well-known to the person skilled in the art and the present invention is not limited to any particular type of dye. By way of example, dyes suitable for use in the present invention include azo dyes (e.g. Food Black 2), metal complex dyes, naphthol dyes, anthraquinone dyes, indigo dyes, carbonium dyes, quinone-imine dyes, xanthene dyes, cyanine dyes, quinoline dyes, nitro dyes, nitroso dyes, benzoquinone dyes, naphthoquinone dyes, phthalocyanine dyes (including naphthalocyanine dyes), and metal phthalocyanine dyes (including metal naphthalocyanine dyes, such as those described in U.S. Pat. No. 7,148,345, the contents of which is herein incorporated by reference).

Examples of suitable dyes include: CI Direct Black 4, 9, 11, 17, 19, 22, 32, 80, 151, 154, 168, 171, 194 and 195; CI Direct Blue 1, 2, 6, 8, 22, 34, 70, 71, 76, 78, 86, 142, 199, 200, 201, 202, 203, 207, 218, 236 and 287; CI Direct Red 1, 2, 4, 8, 9, 11, 13, 15, 20, 28, 31, 33, 37, 39, 51, 59, 62, 63, 73, 75, 80, 81, 83, 87, 90, 94, 95, 99, 101, 110, 189, 225 and 227; CI Direct Yellow 1, 2, 4, 8, 11, 12, 26, 27, 28, 33, 34, 41, 44, 48, 86, 87, 88, 132, 135, 142 and 144; CI Food Black 1 and 2; CI Acid Black 1, 2, 7, 16, 24, 26, 28, 31, 48, 52, 63, 107, 112, 118, 119, 121, 172, 194 and 208; CI Acid Blue 1, 7, 9, 15, 22, 23, 27, 29, 40, 43, 55, 59, 62, 78, 80, 81, 90, 102, 104, 111, 185 and 254; CI Acid Yellow 1, 3, 4, 7, 11, 12, 13, 14, 19, 23, 25, 34, 38, 41, 42, 44, 53, 55, 61, 71, 76 and 79; CI Reactive Blue 1, 2, 3, 4, 5, 6, 7, 8, 9, 13, 14, 15, 17, 18, 19, 20, 21, 25, 26, 27, 28, 29, 31, 32, 33, 34, 37, 38, 39, 40, 41, 43, 44 and 46; CI Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 44, 45, 46, 49, 50, 58, 59, 63, 64, and 180; CI Reactive Yellow 1, 2, 3, 4, 6 7, 11, 12, 13, 14, 15, 16, 17, 18, 22, 23, 24, 25, 26, 27, 37 and 42; CI Reactive Black 1, 3, 4, 5, 6, 8, 9, 10, 12, 13, 14 and 18; Pro-Jet® Fast Cyan 2 (Fujifilm Imaging Colorants); Pro-Jet® Fast Magenta 2 (Fujifilm Imaging Colorants); Pro-Jet® Fast Yellow 2 (Fujifilm Imaging Colorants); and Pro-Jet® Fast Black 2 (Fujifilm Imaging Colorants).

Disazo dyes as described in U.S. Provisional Application No. 61/971,985 filed on Mar. 28, 2014 may be employed in some embodiments of the present invention. In general, such dyes are of formula:

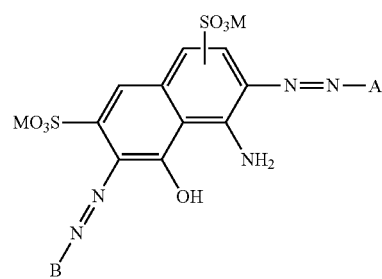

wherein:

A is a $C_{6-14}$ aryl group having 0, 1, 2, 3, 4 or 5 substituents selected from the group consisting of: —$SO_3M$, nitro, carboxyl, halogen, hydroxyl, amino, $C_{1-4}$ alkylamino, $C_{1-4}$ alkoxy, $C_{1-4}$ alkyl, $C_{1-4}$ haloalkyl, cyano, sulfonamide, carbamoyl, $C_{1-4}$ alkylamido and $C_{1-4}$ alkoxycarbonyl; B is a $C_{6-14}$ aryl group having 0, 1, 2, 3, 4 or 5 substituents selected from the group consisting of: —SO$_3$M, nitro, carboxyl, halogen, hydroxyl, amino, $C_{1-4}$ alkylamino, $C_{1-4}$ alkoxy, $C_{1-4}$ alkyl, $C_{1-4}$ haloalkyl, cyano, sulfonamide, carbamoyl, $C_{1-4}$ alkylamido and $C_{1-4}$ alkoxycarbonyl; each M is independently selected from the group consisting of: hydrogen, lithium, sodium, potassium, ammonium and quaternary ammonium; and the dye of formula (I) comprises at least 3 groups of formula —SO$_3$M.

Preferably, A is a phenyl or naphthyl group having 1, 2 or 3 substituents selected from the group consisting of: —SO$_3$M, nitro, carboxyl, halogen, hydroxyl, amino, $C_{1-4}$ alkoxy and $C_{1-4}$ alkyl; and B is a phenyl or naphthyl group having 1, 2 or 3 substituents selected from the group consisting of: —SO$_3$M, nitro, carboxyl, halogen, hydroxyl, amino, $C_{1-4}$ alkoxy and $C_{1-4}$ alkyl.

Conventional pigments suitable for use in the present invention may be inorganic pigments or organic pigments. Examples of conventional pigments are carbon black, Cadmium Red, Molybdenum Red, Chrome Yellow, Cadmium Yellow, Titan Yellow, chromium oxide, Viridian, Titan Cobalt Green, Ultramarine Blue, Prussian Blue, Cobalt Blue, diketopyrrolo-pyrrole, anthraquinone, benzimidazolone, anthrapyrimidine, azo pigments, phthalocyanine pigments (including naphthlocyanine pigments), uinacridone pigments, isoindolinone pigments, dioxazine pigments, indanthrene pigments, perylene pigments, perinone pigments, thioindigo pigments, quinophthalone pigments, and metal complex pigments.

Examples of suitable pigments include: Cyan COJ450 (Cabot), D71C and D75C (Diamond Dispersions); Magenta COJ465 (Cabot), D71M, D75M, D71PV19 (Diamond Dispersions), Hostajet Magenta E-PT VP2690 and Hostajet Magenta E5B-PT VP3565 (Clariant); Yellow COJ270 and COJ470 (Cabot), or D71Y, D71Y155, D75Y (Diamond Dispersions) and Hostajet Yellow 4G-PT VP2669 (Clariant); Black CW1, CW2, CW3 (Orient) or COJ200, COJ300, COJ400 (Cabot) or SDP1000, SDP2000 (Sensient), or D71K, D75K, D77K, D80K (Diamond Dispersions) and Hostajet Black O-PT (Clariant); Red D71R (Diamond Dispersions); Blue D71B (Diamond Dispersions)

The pigments may be self-dispersing pigments, such as surface-modified pigments. The surface modification may be via an anionic group, a cationic group or direct modification of the pigment surface. Typical surface-modifying groups are carboxylate and sulfonate groups. However, other surface-modifying groups may also be used, such as anionic phosphate groups or cationic ammonium groups.

Specific examples of suitable aqueous surface-modified pigment dispersions are Sensijet® Black SDP 2000 and SDP 100 (available from Sensient Colors Inc.), and CAB-O-JET® 200, 300, 250C, 260M and 270Y (available from Cabot Corporation).

The average particle size of pigment particles in inkjet inks is optionally in the range of 50 to 500 nm.

Pigments and dyes may be used in inkjet inks either individually or as a combination of two or more thereof.

Ink Vehicle

The ink vehicles used in the present invention are typically conventional aqueous ink vehicles comprising at least 40 wt % water, at least 50 wt % water or at least 60 wt % water. Usually, the amount of water present in the inkjet ink is in the range of 40 wt % to 90 wt %, or optionally in the range of 50 wt % to 70 wt %.

The ink vehicle may comprise one or more co-solvents (including humectants, penetrants, wetting agents etc.), surfactants, biocides, sequestering agents, pH adjusters, viscosity modifiers, etc.

Co-solvents are typically water-soluble organic solvents. Suitable water-soluble organic solvents include $C_{1-4}$ alkyl alcohols, such as ethanol, methanol, butanol, propanol, and 2-propanol; glycols, such as ethylene glycol, diethylene glycol, triethylene glycol, tetraethylene glycol and pentaethylene glycol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether; formamide, acetamide, dimethyl sulfoxide, sorbitol, sorbitan, glycerol monoacetate, glycerol diacetate, glycerol triacetate, and sulfolane; or combinations thereof.

Other useful water-soluble organic solvents, which may be used as co-solvents, include polar solvents, such as 2-pyrrolidone, N-methylpyrrolidone, E-caprolactam, dimethyl sulfoxide, morpholine, N-ethylmorpholine, 1,3-dimethyl-2-imidazolidinone and combinations thereof.

In addition to the glycol compounds, the inkjet ink may contain another high-boiling water-soluble organic solvent as a co-solvent, which can serve as a wetting agent or humectant for imparting water retentivity and wetting properties to the ink composition. Examples of high-boiling water-soluble organic solvents are 2-butene-1,4-diol, 2-ethyl-1,3-hexanediol, 2-methyl-2,4-pentanediol, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, diethylene glycol monobutyl ether, diethylene glycol monoethyl ether, diethylene glycol monomethyl ether, tripropylene glycol, polyethylene glycols having molecular weights of 2000 or lower, 1,3-propylene glycol, isopropylene glycol, isobutylene glycol, 1,4-butanediol, 1,3-butanediol, 1,5-pentanediol, 1,6-hexanediol, glycerol, trimethylolpropane, erythritol, pentaerythritol and combinations thereof.

Other suitable wetting agents or humectants include saccharides (including monosaccharides, oligosaccharides and polysaccharides) and derivatives thereof (e.g. maltitol, sorbitol, xylitol, hyaluronic salts, aldonic acids, uronic acids etc.)

The inkjet ink may also contain a penetrant, as one of the co-solvents, for accelerating penetration of the aqueous ink into the recording medium. Suitable penetrants include polyhydric alcohol alkyl ethers (glycol ethers) and/or 1,2-alkyldiols. Examples of suitable polyhydric alcohol alkyl ethers are ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether. Examples of suitable 1,2-alkyldiols are 1,2-pentanediol and 1,2-hexanediol. The penetrant may also be selected from straight-chain hydrocarbon diols, such as 1,3-propanediol, 1,4-butanediol, 1,5-pentanediol, 1,6-hexanediol, 1,7-heptanediol, and 1,8-octanediol. Glycerol may also be used as a penetrant.

Typically, the total amount of co-solvent present in the ink is in the range of about 10 wt % to 60 wt %, or optionally 15 wt % to 50 wt %.

The inkjet ink may also contain one or more surface active agents ("surfactant"), such as an anionic surface active agent, a zwitterionic surface active agent, a nonionic surface active agent or mixtures thereof. Useful anionic surface active agents include sulfonic acid types, such as alkanesulfonic acid salts, α-olefinsulfonic acid salts, alkylbenzenesulfonic acid salts, alkylnaphthalenesulfonic acids, acylmethyltaurines, and dialkylsulfosuccinic acids; alkylsulfuric ester salts, sulfated oils, sulfated olefins, polyoxyethylene alkyl ether sulfuric ester salts; carboxylic acid types, e.g., fatty acid salts and alkylsarcosine salts; and phosphoric acid ester types, such as alkylphosphoric ester salts, polyoxyethylene alkyl ether phosphoric ester salts, and glycerophosphoric ester salts. Specific examples of the anionic surface active agents are sodium dodecylbenzenesulfonate, sodium laurate, and a polyoxyethylene alkyl ether sulfate ammonium salt.

Examples of zwitterionic surface active agents include N,N-dimethyl-N-octyl amine oxide, N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide and N,N-dimethyl-N—(Z-9-octadecenyl)-N-amine oxide.

Examples of nonionic surface active agents include ethylene oxide adduct types, such as polyoxyethylene alkyl ethers, polyoxyethylene alkylphenyl ethers, polyoxyethylene alkyl esters, and polyoxyethylene alkylamides; polyol ester types, such as glycerol alkyl esters, sorbitan alkyl esters, and sugar alkyl esters; polyether types, such as polyhydric alcohol alkyl ethers; and alkanolamide types, such as alkanolamine fatty acid amides. Specific examples of nonionic surface active agents are ethers such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, and polyoxyalkylene alkyl ethers (e.g. polyoxyethylene alkyl ethers); and esters, such as polyoxyethylene oleate, polyoxyethylene oleate ester, polyoxyethylene distearate, sorbitan laurate, sorbitan monostearate, sorbitan mono-oleate, sorbitan sesquioleate, polyoxyethylene mono-oleate, and polyoxyethylene stearate.

Acetylene glycol surface active agents, such as 2,4,7,9-tetramethyl-5-decyne-4,7-diol; ethoxylated 2,4,7,9-tetramethyl-5-decyne-4,7-diol; 3,6-dimethyl-4-octyne-3,6-diol or 3,5-dimethyl-1-hexyn-3-ol, may also be used. Specific examples of nonionic surfactants, which may be used in the present invention, are Surfynol® 465 and Surfynol® 440 (available from Air Products and Chemicals, Inc).

The surfactant(s) are typically present in the aqueous inkjet ink in an amount ranging from 0.05 wt. % to 2 wt % or 0.1 to 1 wt. %.

The aqueous inkjet ink may also include a pH adjuster or buffer, such as sodium hydroxide, potassium hydroxide, lithium hydroxide, sodium carbonate, sodium hydrogencarbonate, potassium carbonate, potassium hydrogencarbonate, lithium carbonate, sodium phosphate, potassium phosphate, lithium phosphate, potassium dihydrogenphosphate, dipotassium hydrogenphosphate, sodium oxalate, potassium oxalate, lithium oxalate, sodium borate, sodium tetraborate, potassium hydrogenphthalate, and potassium hydrogentartrate; ammonia; and amines, such as methylamine, ethylamine, diethylamine, trimethylamine, triethylamine, tris(hydroxymethyl)aminomethane hydrochloride, triethanolamine, diethanolamine, diethylethanolamine, triisopropanolamine, butyldiethanolamine, morpholine, propanolamine, 4-morpholineethanesulfonic acid and 4-morpholinepropanesulfonic acid ("MOPS"). The amount of pH adjuster, when present, is typically in the range of from 0.01 to 2 wt. % or 0.05 to 1 wt. %. The inkjet inks used in the present invention are generally alkaline.

The aqueous inkjet ink may also include a biocide, such as benzoic acid, dichlorophene, hexachlorophene, sorbic acid, hydroxybenzoic esters, sodium dehydroacetate, 1,2-benthiazolin-3-one ("Proxel® GXL", available from Arch Chemicals, Inc.), 3,4-isothiazolin-3-one or 4,4-dimethyloxazolidine. The amount of biocide, when present, is typically in the range of from 0.01 to 2 wt. % or 0.05 to 1 wt. %.

The aqueous inkjet ink may also contain a sequestering agent, such as ethylenediaminetetraacetic acid (EDTA).

Inkjet Printheads

The inks according to the present invention are primarily for use in connection with thermal inkjet printheads, although they may be used in other types of printhead, especially those where an actuator contacts the ink. For the sake of completeness, there now follows a brief description of one of the Applicant's thermal inkjet printheads, as described in U.S. Pat. No. 7,303,930, the contents of which is herein incorporated by reference.

Figure 2:
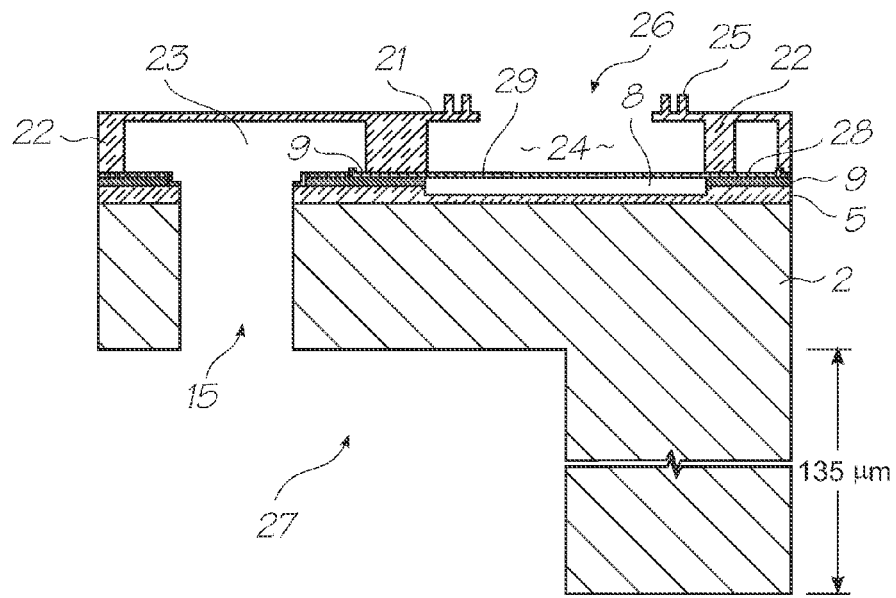
FIG. 2 is a side view of one of the nozzle assemblies shown in FIG. 1.
Figure 3:
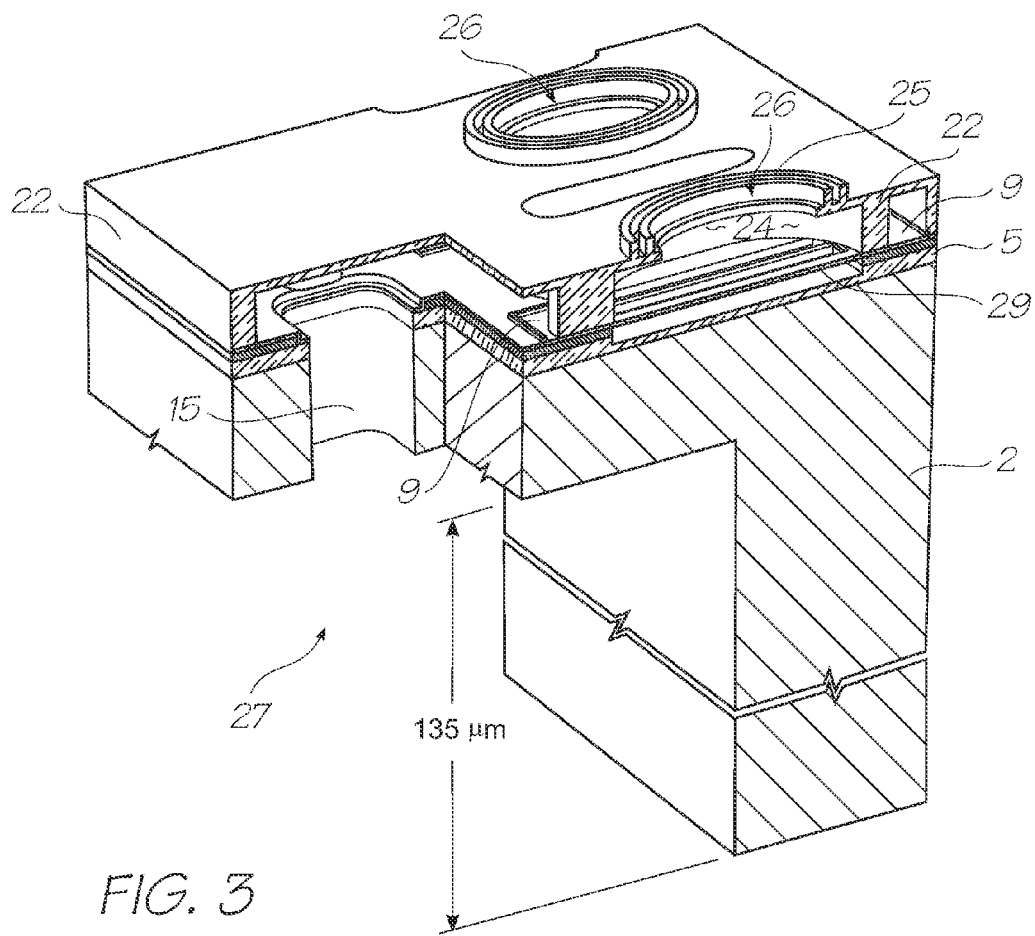
FIG. 3 is a perspective of the nozzle assembly shown in FIG. 2.

Referring to FIG. 1, there is shown part of a printhead comprising a plurality of nozzle assemblies. FIGS. 2 and 3 show one of these nozzle assemblies in side-section and cutaway perspective views.

Each nozzle assembly comprises a nozzle chamber 24 formed by MEMS fabrication techniques on a silicon wafer substrate 2. The nozzle chamber 24 is defined by a roof 21 and sidewalls 22 which extend from the roof 21 to the silicon substrate 2. As shown in FIG. 1, each roof is defined by part of a nozzle plate 56, which spans across an ejection face of the printhead. The nozzle plate 56 and sidewalls 22 are formed of the same material, which is deposited by PECVD over a sacrificial scaffold of photoresist during MEMS fabrication. Typically, the nozzle plate 56 and sidewalls 21 are formed of a ceramic material, such as silicon dioxide or silicon nitride. These hard materials have excellent properties for printhead robustness, and their inherently hydrophilic nature is advantageous for supplying ink to the nozzle chambers 24 by capillary action.

Returning to the details of the nozzle chamber 24, it will be seen that a nozzle opening 26 is defined in a roof of each nozzle chamber 24. Each nozzle opening 26 is generally elliptical and has an associated nozzle rim 25. The nozzle rim 25 assists with drop directionality during printing as well as reducing, at least to some extent, ink flooding from the nozzle opening 26. The actuator for ejecting ink from the nozzle chamber 24 is a heater element 29 positioned beneath the nozzle opening 26 and suspended across a pit 8. Current is supplied to the heater element 29 via electrodes 9 connected to drive circuitry in underlying CMOS layers of the substrate 2. When a current is passed through the heater element 29, it rapidly superheats surrounding ink to form a gas bubble, which forces ink through the nozzle opening 26. By suspending the heater element 29, it is completely immersed in ink when the nozzle chamber 24 is primed. This improves printhead efficiency, because less heat dissipates into the underlying substrate 2 and more input energy is used to generate a bubble. Typically, the heater element is comprised of a metal or a conductive ceramic material. Examples of suitable materials include titanium nitride, titanium aluminium nitride and titanium-aluminium alloy.

As seen most clearly in FIG. 1, the nozzles are arranged in rows and an ink supply channel 27 extending longitudinally along the row supplies ink to each nozzle in the row. The ink supply channel 27 delivers ink to an ink inlet passage 15 for each nozzle, which supplies ink from the side of the nozzle opening 26 via an ink conduit 23 in the nozzle chamber 24.

A MEMS fabrication process for manufacturing such printheads is described in detail in U.S. Pat. No. 7,303,930, the contents of which are herein incorporated by reference.

The operation of printheads having suspended heater elements is described in detail in the Applicant's U.S. Pat. No. 7,278,717, the contents of which are incorporated herein by reference.

The Applicant has also described thermal bubble-forming inkjet printheads having embedded heater elements. Such printheads are described in, for example, U.S. Pat. No. 7,246,876 and US 2006/0250453, the contents of which are herein incorporated by reference.

The inkjet inks of the present invention function optimally in combination with the Applicant's thermal inkjet printheads, as described above. However, their use is not limited to the Applicant's thermal printheads. The inks described herein may be used in other types of thermal bubble-forming inkjet printheads, piezoelectric printheads and thermal-bend actuated printheads (as described in, for example, U.S. Pat. No. 7,926,915; U.S. Pat. No. 7,669,967; and US 2011/0050806, the contents of which are incorporated herein by reference) etc.

For the sake of completeness, inkjet printers incorporating the Applicant's thermal inkjet printheads are described in, for example, U.S. Pat. No. 7,201,468; U.S. Pat. No. 7,360,861; U.S. Pat. No. 7,380,910; and U.S. Pat. No. 7,357,496, the contents of each of which are herein incorporated by reference.

Figure 4:
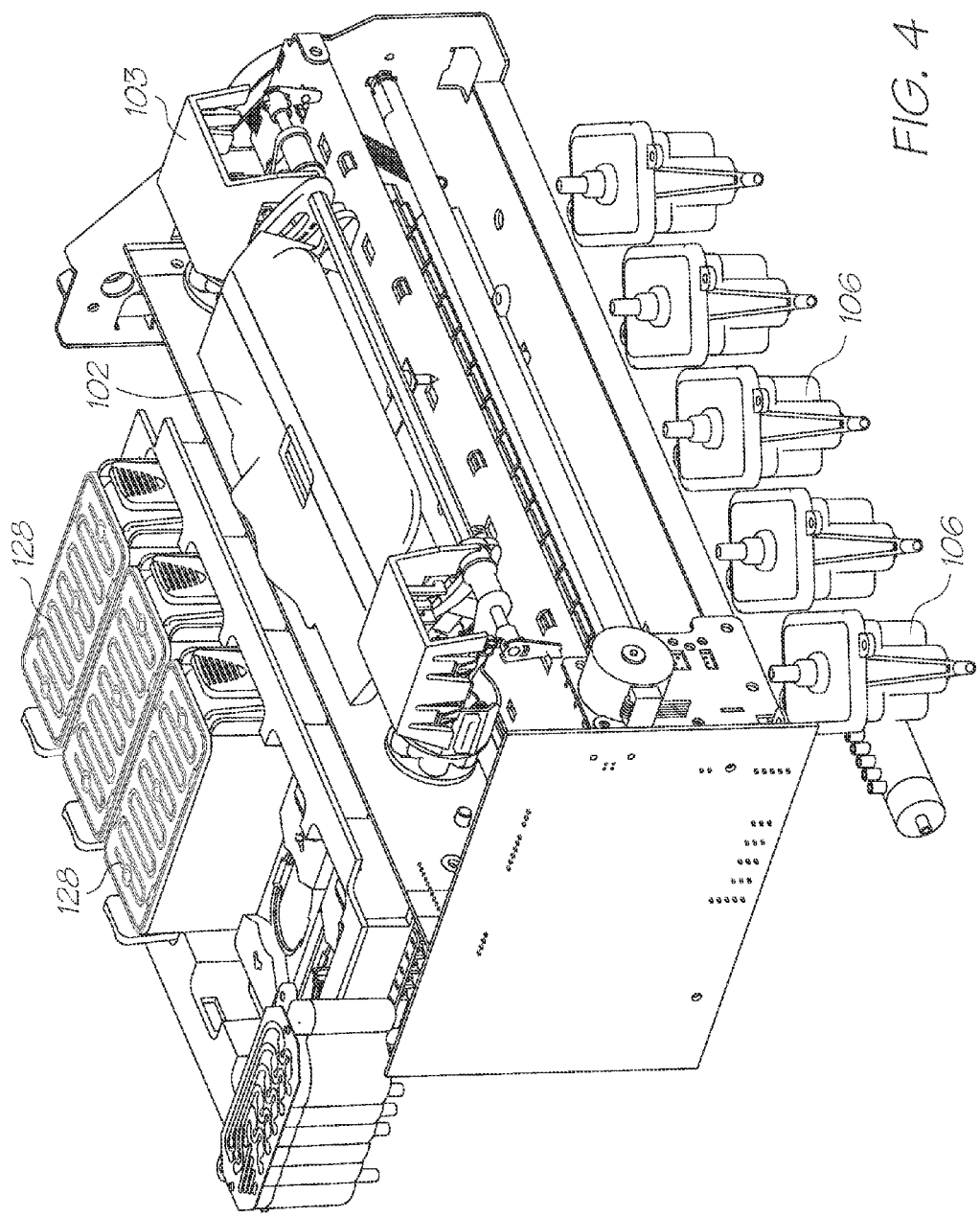
FIG. 4 is perspective view of a thermal inkjet print engine.

FIG. 4 shows a print engine 103 for a thermal inkjet printer, as described in Applicant's U.S. Pat. No. 8,066,359, the contents of which is herein incorporated by reference. The print engine 103 includes a removable print cartridge 102, comprising a pagewidth printhead, and a bank of user-replaceable ink cartridges 128. Each color channel typically has its own ink reservoir 128 and a corresponding pressure-regulating chamber 106 for regulation of a hydrostatic pressure of ink supplied to the printhead. Hence, the print engine 103 has five ink reservoirs 128 and five corresponding pressure-regulating chambers 106. Typically, the ink channels ("color channels") employed in this five-channel print engine 103 are $CMYK_1K_2$. The ink channel order may be arranged so as to optimize preferred ink color mixing effects at the nozzle plate of the printhead, as described in US2013/0070024, the contents of which are herein incorporated by reference. For example, an ink channel order of $YK_1MK_2C$ may be employed where cyan (C) is positioned furthest downstream and yellow (Y) is positioned furthest upstream.

At least one of the ink cartridges 128 may comprise an inkjet ink as described herein. Although fluidic connections between the various components are not shown in FIG. 4, it will be appreciated that these connections are made with suitable hoses in accordance with the fluidics system described in, for example, U.S. Pat. No. 8,066,359, the contents of which are incorporated herein by reference.

Experimental Section

Accelerated printhead lifetime tests were conducted in accordance with the method described below.

Memjet® printhead integrated circuits (PHICs) having nozzle devices with suspended uncoated resistive heater elements were mounted individually for operation in a modified printing rig. The heater element material exposed to the ink is titanium aluminium nitride.

The devices were operated to eject ink at a frequency of 11 kHz. Actuation pulse widths were controlled to replicate operation in an otherwise unmodified printer. Test patterns were printed periodically and visually inspected to determine the health of the devices. Once the print quality had fallen below a predetermined threshold, the PHIC was deemed to have reached the end of its lifetime and the test was stopped. The number of ejections at the time of printhead failure was recorded to indicate printhead lifetime.

Black Inks

Black inks were formulated as described in Table 1 and filtered (0.2 microns) prior to use.

TABLE 1

Black ink formulations for accelerated printhead lifetime tests

|  | Black Ink 1 | Comparative Black Ink 2 | Comparative Black Ink 3 | Comparative Black Ink 4 |
| --- | --- | --- | --- | --- |
| Sulfolane | 24 | 24 | 24 | 24 |
| Triethylene glycol | 2.7 | 2.7 | 2.7 | 2.7 |
| Glycerol | 4.3 | 4.3 | 4.3 | 4.3 |
| Black Disazo dye[1] | 3.9 | 3.9 | 3.9 | 3.9 |
| Butoxyne ™ 497[2] | 2 |  |  | 2 |
| Liponic ® EG-1[3] | 1 |  | 1 |  |
| MOPS[4] | 0.2 | 0.2 | 0.2 | 0.2 |
| Surfynol ® 465[5] | 0.2 | 0.2 | 0.2 | 0.2 |
| Proxel ® GXL | 0.2 | 0.2 | 0.2 | 0.2 |
| Water | balance | balance | balance | balance |

[1]K1600 black dye of formula (I) supplied by Ilford Imaging GmbH
[2]Butoxyne ™ 497 is 1,4-bis(2-hydroxyethoxy)-2-butyne, supplied by Ashland Inc.
[3]Liponic ® EG-1 is an ethoxylated glyercol (26 molar equivalent of ethoxylate) available from Lipo Chemicals
[4]MOPS is 3-(N-morpholino)propanesulfonic acid
[5]Surfynol ® 465 is ethoxylated 2,4,7,9-tetramethyl-5-decyne-4,7-diol, available from Air Products and Chemicals, Inc Black Ink 1 and Comparative Black Inks 2 to 4 were tested in the modified printing rig described above and the number of ejections before printhead failure, as judged by visual inspection of a standardized print quality test pattern, was determined. The results from these accelerated printhead lifetime tests are shown in Table 2.

TABLE 2

Accelerated printhead lifetime test results

| Tested Ink | Millions of ejections before failure |
| --- | --- |
| Black Ink 1 | 425 |
| Comparative Black Ink 2 | 170 |
| Comparative Black Ink 3 | 240 |
| Comparative Black Ink 4 | 260 |

From Table 2, it can be seen that the baseline ink (Comparative Black Ink 2) having no additives ejected about 170 million droplets before failure. This is consistent with the performance of a similar ink, as reported U.S. Provisional Application No. 61/971,985 filed on Mar. 28, 2014.

With the addition of an ethoxylated glycerol ("LEG-1") in Comparative Black Ink 3, a relative improvement (240 million ejections) in printhead lifetime was observed. Likewise, with the addition of an ethoxylated butynediol (Butoxyne™ 497), a relative improvement (260 million ejections) in printhead lifetime was observed in Comparative Black Ink 4, which is broadly consistent with the expected ink performance, as reported in U.S. application Ser. No. 14/310,298.

However, with the addition of the ethoxylated glycerol and ethoxylated butynediol in Black Ink 1, an exceptional improvement in printhead lifetime was observed. In particular, the printhead lifetime was increased by about 2.5 times to 425 million ejections with the combination of both additives. It was therefore concluded that the additives behave synergistically in situ to protect the heater elements in the printhead and improve lifetime. The synergistic behavior was not predictable either from the prior art or from the performance of each additive in isolation.

Magenta Inks

Tables 1 and 2 demonstrate the synergistic effects of the ethoxylated glycerol and ethoxylated butynediol for improving printhead lifetime performance in a series of comparable black ink formulations. Optimization of printhead lifetime was investigated in a series of magenta ink formulations.

Magenta inks were formulated as described in Table 3 and filtered (0.2 microns) prior to use.

TABLE 3

Magenta ink formulations for accelerated printhead lifetime tests

| | Magenta Ink 1 | Magenta Ink 2 | Magenta Ink 3 | Magenta Ink 4 | Magenta Ink 5 | Magenta Ink 6 |
|---|---|---|---|---|---|---|
| Sulfolane | 21.0 | 21.0 | 21.0 | 21.0 | 21.0 | 21.0 |
| Triethylene glycol | 4.6 | 2.7 | 2.7 | 2.7 | 5.3 | 3.7 |
| Glycerol | 7.4 | 4.3 | 4.3 | 4.3 | 8.4 | 5.9 |
| 1,3-propanediol | | | | | | |
| Magenta dye[6] | 4.0 | 4.0 | 4.0 | 4.0 | 4.0 | 4.0 |
| Butoxyne ™ 497[2] | 1.5 | 4.5 | 4.5 | 1.5 | 3.0 | 5.5 |
| Liponic ® EG-1[3] | 4.0 | 4.0 | 0.8 | 0.8 | 2.4 | 2.4 |
| PEG300 | | | | | | |
| MOPS[4] | 0.2 | 0.2 | 0.2 | 0.2 | 0.2 | 0.2 |
| Surfynol ® 465[5] | 1.0 | 1.0 | 1.0 | 1.0 | 1.0 | 1.0 |
| Proxel ® GXL | 0.2 | 0.2 | 0.2 | 0.2 | 0.2 | 0.2 |
| Water | balance | balance | balance | balance | balance | balance |

| | Magenta Ink 7 | Magenta Ink 8 | Magenta Ink 9 | Comparative Magenta Ink 1 |
|---|---|---|---|---|
| Sulfolane | 21.0 | 21.0 | | 24.0 |
| Triethylene glycol | 3.7 | 3.7 | | 5.0 |
| Glycerol | 5.9 | 5.9 | | 8.0 |
| 1,3-propanediol | | | 9.0 | |
| Magenta dye[6] | 4.0 | 4.0 | 4.0 | 4.0 |
| Butoxyne ™ 497[2] | 3.0 | 0.5 | 1.3 | |
| Liponic ® EG-1[3] | 5.1 | 2.4 | | 2.4 |
| PEG300 | | | 6.0 | |
| MOPS[4] | 0.2 | 0.2 | 0.2 | 0.2 |
| Surfynol ® 465[5] | 1.0 | 1.0 | 0.5 | 1.0 |
| Proxel ® GXL | 0.2 | 0.2 | 0.2 | 0.2 |
| Water | balance | balance | balance | balance |

[6]Magenta dye (IJINKM-001SLK) available from FujiFilm Imaging Colorants, Inc

Magenta Inks 1 to 8 and Comparative Magenta Ink 1 were tested in the modified printing rig described above and the number of ejections before printhead failure, as judged by visual inspection of a standardized print quality test pattern, was determined. The results from these accelerated printhead lifetime tests are shown in Table 4.

TABLE 4

Accelerated printhead lifetime test results

| Tested Ink | Millions of ejections before failure |
|---|---|
| Magenta Ink 1 | 160 |
| Magenta Ink 2 | 295 |
| Magenta Ink 3 | 690 |
| Magenta Ink 4 | 495 |
| Magenta Ink 5 | 205 |
| Magenta Ink 6 | 265 |
| Magenta Ink 7 | 200 |
| Magenta Ink 8 | 265 |
| Magenta Ink 9 | 530 |
| Comparative Magenta Ink 1 | 150 |

From Tables 3 and 4, it can be seen that Magenta Inks 3 and 4 performed excellently where the amount of ethoxylated butynediol was greater than the amount of ethoxylated glycerol. For optimal printhead lifetimes, the amount of ethoxylated butynediol is preferably at least 1.5 times or at least 2 times greater than the amount of ethoxylated glycerol. Furthermore, the amount of ethoxylated glycerol is preferably less than 3 wt. % or less than 2 wt. %, and typically in the range of 0.5 to 3 wt. % or 0.5 to 2 wt. %. The amount of ethoxylated butynediol is preferably at least 1 wt. %, and typically in the range of 1 to 5 wt. %.

From Tables 3 and 4, it can also be seen that PEG300 performed excellently as an anti-kogation additive in combination with ethoxylated butynediol as an anti-corrosion additive. Substituting Liponic® EG-1 with PEG300 required greater amount of the anti-kogation additive relative to the anti-corrosion additive.

Cyan Inks

Optimization of printhead lifetime was investigated in a series of cyan ink formulations. Cyan inks were formulated as described in Table 5 and filtered (0.2 microns) prior to use.

TABLE 5

Cyan ink formulations for accelerated printhead lifetime tests

|  | Comparative Cyan Ink 1 | Comparative Cyan Ink 2 | Comparative Cyan Ink 3 | Cyan Ink 1 |
|---|---|---|---|---|
| Sulfolane | 21.0 | 21.0 | 21.0 | 21.0 |
| Triethylene glycol | 5.0 | 5.0 | 5.0 | 5.0 |
| Glycerol | 8.0 | 8.0 | 8.0 | 8.0 |
| Cyan 1[7] | 5.0 | 5.0 | 5.0 | 5.0 |
| Butoxyne ™ 497[2] |  |  |  | 2.0 |
| Liponic ® EG-1[3] |  | 2.5 | 4.0 | 4.0 |
| MOPS[4] | 0.2 | 0.2 | 0.2 | 0.2 |
| Surfynol ® 465[5] | 1.0 | 1.0 | 1.0 | 1.0 |
| Proxel ® GXL | 0.2 | 0.2 | 0.2 | 0.2 |
| Water | balance | balance | balance | balance |

[7]Cyan dye (ProJet ™ Cyan 1) available from FujiFilm Imaging Colorants, Inc

Comparative Cyan Inks 1 to 3 and Cyan Ink 1 were tested in the printhead lifetime test described above and the results are shown in Table 6.

TABLE 6

Accelerated printhead lifetime test results

| Tested Ink | Millions of ejections before failure |
|---|---|
| Comparative Cyan Ink 1 | 200 |
| Comparative Cyan Ink 1 | 180 |
| Comparative Cyan Ink 1 | 210 |
| Cyan Ink 1 | 680 |

From Tables 5 and 6, it can be seen that only the cyan ink containing ethoxylated butynediol and ethoxylated glycerol showed a significant improvement in printhead lifetime.

A range of other anti-kogation additives were tested in the cyan ink formulations shown in Table 7.

TABLE 7

Alternative cyan ink formulations for accelerated printhead lifetime tests

|  | Comparative Cyan Ink 4 | Cyan Ink 2 | Cyan Ink 3 | Cyan Ink 4 | Cyan Ink 5 | Cyan Ink 6 |
|---|---|---|---|---|---|---|
| Sulfolane | 21.0 | 21.0 | 21.0 | 21.0 | 21.0 | 21.0 |
| Triethylene glycol | 5.0 | 5.0 | 5.0 | 5.0 | 5.0 | 5.0 |
| Glycerol | 8.0 | 8.0 | 8.0 | 8.0 | 8.0 | 8.0 |
| Cyan GLF[8] | 5.0 | 5.0 | 5.0 | 5.0 | 5.0 | 5.0 |
| Butoxyne ™ 497[2] |  | 1.0 | 2.0 | 1.0 | 1.0 | 1.0 |
| Liponic ® EG-1[3] |  | 2.0 | 4.0 |  |  |  |
| Liponic ® EG-7[9] |  |  |  | 4.0 |  |  |
| THMP[10] |  |  |  |  | 4.0 |  |
| Gly Prop 266[11] |  |  |  |  |  | 4.0 |
| MOPS[4] | 0.2 | 0.2 | 0.2 | 0.2 | 0.2 | 0.2 |
| Surfynol ® 465[5] | 1.0 | 1.0 | 1.0 | 1.0 | 1.0 | 1.0 |
| Proxel ® GXL | 0.2 | 0.2 | 0.2 | 0.2 | 0.2 | 0.2 |
| Water | balance | balance | balance | balance | balance | balance |

[8]Cyan dye (ProJet ™ Cyan GLF) available from FujiFilm Imaging Colorants, Inc
[9]Liponic ® EG-7 is an ethoxylated glyercol (7 molar equivalent of ethoxylate) available from Lipo Chemicals
[10]THMP is tris(hyroxymethyl)phosphine
[11]Gly Prop 266 is glycerol propoxylate having an average molecular weight of 266

Comparative Cyan Ink 4 and Cyan Inks 2 to 6 were tested in the printhead lifetime test described above and the results are shown in Table 8.

TABLE 8

Accelerated printhead lifetime test results

| Tested Ink | Millions of ejections before failure |
|---|---|
| Comparative Cyan Ink 4 | 210 |
| Cyan Ink 2 | 560 |
| Cyan Ink 3 | 640 |
| Cyan Ink 4 | 350 |
| Cyan Ink 5 | 400 |
| Cyan Ink 6 | 730 |

From Tables 7 and 8, it can be seen that cyan inks containing a combination of ethoxylated butynediol and a variety of alternative anti-kogation additives showed a significant improvement in printhead lifetime.

From the foregoing, it will be understand that appreciable improvements were observed in different colored dye-based inks Similar improvements were observed in pigment-based inks Therefore, the surprising and advantageous effects of the additive combination described herein is considered to be universally applicable to a range of inks, and is not limited to any particular colorant or ink vehicle.

It will, of course, be appreciated that the present invention has been described by way of example only and that modifications of detail may be made within the scope of the invention, which is defined in the accompanying claims.

The invention claimed is:

1. An inkjet ink comprising:
an aqueous-based ink vehicle;
a colorant;
an anti-kogation additive comprising a first organic compound having at least three moieties selected from the group consisting of: —$(CH_2CH_2O)$—; —$(CH_2CH(Me)O)$—; —$CH_2OH$; and —$CH(OH)$—;
an anti-corrosion additive of formula (B):

$$R^1-C\equiv C-(CH_2)_m CH(R^2)-(OCH_2R^3)_n-OH \quad (B)$$

wherein:
R¹ is selected from the group consisting of: H, C1-3 alkyl, —(CH2)pCH(R4)(R5) and —(C≡C)—(CH2)pCH(R4)(R5);
R² is selected from the group consisting of: H and C1-3 alkyl;
R³ is selected from the group consisting of: —CH2- and —CH(CH3)-;
R⁴ is selected from the group consisting of: H and C1-3 alkyl;
R⁵ is selected from the group consisting of: H, C1-3 alkyl, —OH and —(OCH2R3)q-OH;
m is 0, 1, 2 or 3;
p is 0, 1, 2 or 3; and
n is 0 or an integer in the range of 1 to 50; and
q is an integer in the range of 1 to 50,
and wherein the first and second organic compounds are different than each other.

2. The inkjet ink of claim 1, wherein the anti-kogation additive is selected from the group consisting of glycerol ethoxylates, glycerol propoxylates, erythritol ethoxylates, erythritol propoxylates, arabitol ethoxylates, arabitol propoxylates, mannitol ethoxylates, mannitol propoxylates, trimethylolpropane ethoxylates, trimethylolpropane propoxylates, pentaerythritol ethoxylates, pentaerythritol propoxylates, polyethylene glycols (e.g. PEG200, PEG300, PEG400, PEG600, PEG1000, PEG2000 etc), polypropylene glycols, tris(hydroxymethyl)phosphine, tris(hydroxymethyl)phosphine ethoxylates, tris(hydroxymethyl)phosphine propoxylates, tris(hydroxymethyl)phosphine oxide, tris(hydroxymethyl)phosphine oxide ethoxylates, tris(hydroxymethyl)phosphine oxide propoxylates, triethanolamine, triethanolamine ethoxylates, triethanolamine propoxylates, ethylene di amine ethoxylates and ethylene diamine propoxylates.

3. The inkjet ink of claim 2, wherein the anti-kogation additive is selected from the group consisting of glycerol ethoxylates, glycerol propoxylates, polyethylene glycols and tris(hydroxymethyl)phosphine.

4. The inkjet ink of claim 3, wherein the anti-kogation additive is an alkoxylated glycerol compound of formula (A):

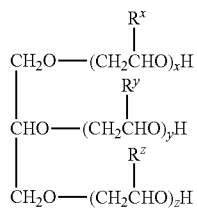
(A)

wherein:
Rˣ, Rʸ and Rᶻ are independently selected from the group consisting of hydrogen and methyl;
x, y and z are each integers in the range of 1 to 50.

5. The inkjet ink of claim 1, wherein the aqueous-based ink vehicle comprises water and one or more co-solvents.

6. The inkjet ink of claim 1, wherein the one or more co-solvents are selected from the group consisting of: sulfolane, ethylene glycol, diethylene glycol, triethylene glycol, tetraethylene glycol, glycerol, 1,3-propanediol, 2-pyrrolidone and N-methyl-2-pyrrolidone.

7. The inkjet ink of claim 1, wherein the aqueous-based ink vehicle comprises one or more surfactants.

8. The inkjet ink of claim 4, wherein the alkoxylated glycerol compound of formula (A) is present in an amount ranging from 0.5 to 5 wt. %.

9. The inkjet ink of claim 1, wherein the anti-corrosion additive is present in an amount ranging from 1 to 5 wt. %.

10. The inkjet ink of claim 1, wherein a combined amount of the anti-kogation additive and the anti-corrosion additive is in the range of 1 to 10 wt. %.

11. The inkjet ink of claim 1, wherein a ratio of the anti-corrosion additive to anti-kogation additive is in the range of 1:5 to 5:1.

12. The inkjet ink of claim 4, wherein the amount of the anti-corrosion additive is at least 1.5 times greater than the amount of the alkoxylated glycerol compound of formula (A).

13. The inkjet ink of claim 1, wherein the colorant is selected from the group consisting of dyes and pigments.

14. The inkjet ink of claim 4, wherein Rˣ, Rʸ and Rᶻ are each hydrogen and x+y+z=3 to 30.

15. The inkjet ink of claim 1, wherein the anti-corrosion additive is of formula (C):

(C)

wherein:
R⁶ is selected from the group consisting of: —CH₂OH and —CH₂(OCH₂CH₂)—OH.

16. A method of improving a lifetime of an inkjet printhead, the method comprising the steps of:
supplying an ink according to claim 1 to nozzle chambers of the printhead, each nozzle chamber having an associated actuator in contact with the ink; and
actuating one or more of the actuators to eject ink from the printhead.

17. The method of claim 16, wherein each actuator comprises an uncoated resistive heater element.

18. The method of claim 17, wherein the heater element is comprised of a material selected from the group consisting of:
a titanium alloy;
titanium nitride; and
a nitride of a titanium alloy.

19. The method of claim 16, wherein the printhead has a lifetime of at least 150 million ejections.

20. An inkjet ink comprising:
an aqueous-based ink vehicle;
a colorant;
an anti-kogation additive of formula (A):

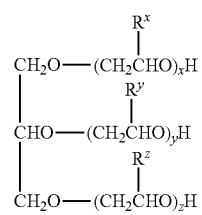
(A)

wherein:
Rˣ, Rʸ and Rᶻ are independently selected from the group consisting of hydrogen and methyl; and
x, y and z are each integers in the range of 1 to 50; and
an anti-corrosion additive comprising a second organic compound having at least one acetylenic moiety, the acetylenic moiety being absent any tertiary or quaternary α-carbon atoms.

21. The inkjet ink of claim 20, wherein the alkoxylated glycerol compound of formula (A) is present in an amount ranging from 0.5 to 5 wt. %.

22. The inkjet ink of claim 20, wherein the amount of the anti-corrosion additive is at least 1.5 times greater than the amount of the alkoxylated glycerol compound of formula (A).

23. The inkjet ink of claim 20, wherein the anti-corrosion additive is of formula (C):

  (C)

wherein:
R$^6$ is selected from the group consisting of: —CH$_2$OH and —CH$_2$(OCH$_2$CH$_2$)—OH.

24. A method of improving a lifetime of an inkjet printhead, the method comprising the steps of:
supplying an ink according to claim 20 to nozzle chambers of the printhead, each nozzle chamber having an associated actuator in contact with the ink; and
actuating one or more of the actuators to eject ink from the printhead.

* * * * *